June 9, 1925.
H. MACK
TRACTOR HITCH
Filed Jan. 26, 1924
1,540,854
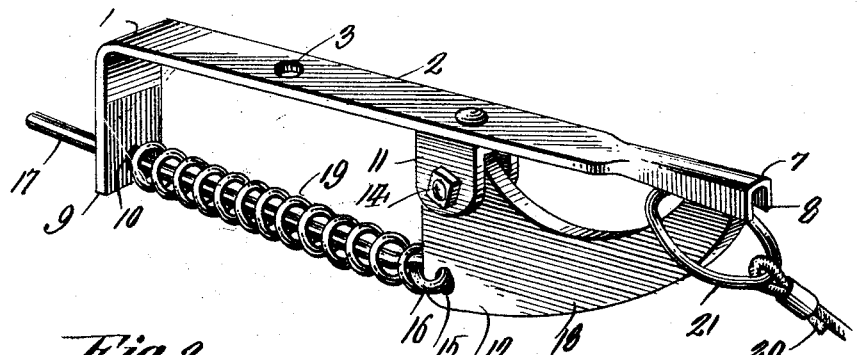
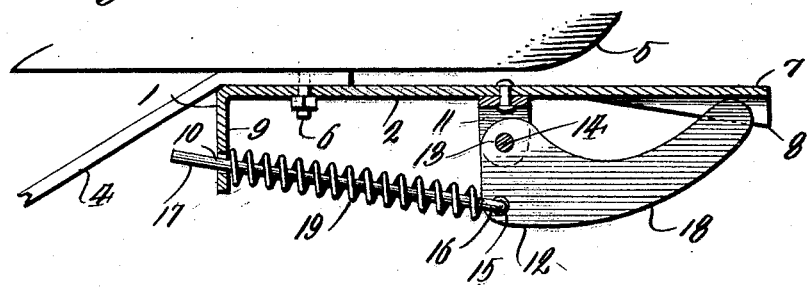
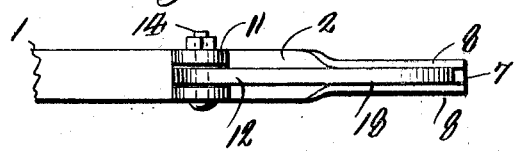
WITNESSES
Inventor
HAROLD MACK
By Richard B. Owen, Attorney Patented June 9, 1925.

1,540,854

UNITED STATES PATENT OFFICE.

HAROLD MACK, OF FINLAYSON, MINNESOTA.

TRACTOR HITCH.

Application filed January 26, 1924. Serial No. 688,823.

*To all whom it may concern:*

Be it known that I, HAROLD MACK, a citizen of the United States, residing at Finlayson, in the county of Pine and State of Minnesota, have invented certain new and useful Improvements in Tractor Hitches, of which the following is a specification.

This invention relates to a tractor hitch and has for its principal object to provide a device of this nature which will automatically release when an excessive pull is exerted thereon. The invention is designed primarily for use with tractors pulling plows and the like. Should the plow become engaged with a rock or some other similar object which usually causes the cable between the plow and tractor to become disengaged, this hitch will release the trip rope so that it will not be broken. The hitch embodies a structure which is easily manipulated, inexpensive to manufacture, durable, and well adapted to the purpose for which it is designed.

With the above and other numerous objects in view as will appear as the description progresses, the invention resides in certain novel features of construction, and in the combination and arrangement of parts as will be hereinafter more fully described and claimed.

In the drawing:

Figure 1 is a perspective view of the hitch embodying my invention,

Figure 2 is a longitudinal section taken therethrough showing the hitch attached to a portion of a tractor, and Figure 3 is a fragmentary bottom plan view of the hitch.

Referring to the drawing in detail it will be seen that 1 designates the body of the hitch which is in the form of an L-shaped bar. The long arm 2 of this body 1 is provided with an aperture 3 so that it may be bolted to a tractor. One form of attaching this body 1 to a tractor is illustrated in Figure 2 wherein the numeral 4 indicates a standard rising from the tractor upon which is mounted the seat 5 held in place by a bolt 6 which pierces the aperture 3 and holds the body 1 in place as well as the seat 5. Of course this hitch may be attached to a tractor in any other suitable or convenient manner the present showing being given merely by way of example.

The end 7 of the long arm 2 is provided with a pair of spaced parallel depending wedge shaped plates 6. The shorter arm 9 of the body 1 is provided with the aperture 10. A U-shaped bracket 11 is attached to the under surface of an intermediate portion of the long arm 2 and pivotally supports a plate 12 which is provided with an aperture 13 at one end for receiving a bolt 14 supported by the bracket 11 and the other end is provided with an aperture 15 for receiving the eye 16 of a pin 17 which pierces the aperture 10 of the shorter arm 9. The plate 12 is constructed with a curved elongated arm 18 and a spring 19 is disposed about the pin 17 between the plate 12 and the shorter arm 8 and is tensioned so as to normally hold the plate 12 in the position shown in the drawing that is so that the end of the arm 18 is disposed between the wedge shaped plates 8.

The cable 20 which is adapted to be fixed to the usual trip mechanism between the plow and the tractor is provided at its end with a ring 21 but may be passed over the curved arm 18. As the tractor is hauling the plow or like implement along, it will be seen that should the plow meet an obstacle which would have sufficient resistance to actuate the trip and perchance break the cable 20 that the ring 21 will be pulled along the edges of the wedge shaped plates 8 and the inner curved side of the arm 18 thereby pivoting the plate 12 so as to compress spring 19 and allow the ring to be released from the hitch so that the plow or like implement may be expedited from the obstacle after which the ring may be easily reengaged with the arm 18.

It is thought that the construction and operation of this hitch will now be clearly understood without any more detail description. It is desired, however, to point out that numerous changes in the details of construction, and in the combination and arrangement of parts may be resorted to without departing from the spirit or scope of the invention as hereinafter claimed.

Having thus described my invention, what I claim as new is:

1. A tractor hitch of the class described including a body in the form of an L-shaped bar, the terminal of the longer portion thereof being provided with a pair of spaced wedge shaped plates tapering inwardly, an arm pivoted to the longer portion of the body so that its terminal abuts the body between the plates, and a spring impinging between the shorter portion of the body and the arm for holding the end of said arm normally between said plates.

2. A tractor hitch of the class described including a body in the form of an L-shaped bar, the longer arm of said bar having its terminal provided with a pair of spaced parallel wedge shaped plates tapering inwardly, a bracket extending from an intermediate portion of the longer arm of the body, a plate pivoted in the bracket and provided with a curved arm the terminal of which is adapted to abut the body between its parallel spaced plates, a pin engaged with the pivoted plate and piercing the shorter arm of the body, and a spring disposed about the pin between the shorter arm of the body and the pivoted plate thereby normally holding the end of the arm of the plate between the spaced parallel plates of the body.

3. In combination, a standard, a seat positioned on the end of the standard, a bolt projecting from the seat through the standard, a tractor hitch receivable by said bolt, said hitch including an L-shaped body the longer arm of which is provided with an aperture for receiving said bolt and the end of which is constructed with a pair of depending wedge shaped parallel plates, a bracket depending from the intermediate portion of the longer arm of the body, a plate pivoted in said bracket and having an aperture in its end, a pin receivable in said aperture, the shorter arm of said body being provided with an aperture for receiving the pin, a spring disposed about the pin between the shorter arm of the body and the plate, said plate constructed with a curved arm normally held with its terminals between the plates of the body by said spring and a ring engageable with said arm.

4. A tractor hitch of the class described including an elongated body one terminal of which is provided with a pair of spaced wedge shaped plates tapering inwardly, an arm pivoted to an intermediate portion of the body so that its end may abut the body between the plates, and spring means urging the arm so that its end abuts the body between the plates.

In testimony whereof I affix my signature in presence of two witnesses.

HAROLD MACK.

Witnesses:
 HERMAN MACK,
 JOHN NORBACK.